(12) United States Patent
Bartlett

(10) Patent No.: US 8,402,006 B1
(45) Date of Patent: Mar. 19, 2013

(54) PORTION GENERATION, CERTIFICATION, AND VERIFICATION

(75) Inventor: Andrew C. Bartlett, Westborough, MA (US)

(73) Assignee: The MathWorks, Inc., Natick, MA (US)

( * ) Notice: Subject to any disclaimer, the term of this patent is extended or adjusted under 35 U.S.C. 154(b) by 507 days.

(21) Appl. No.: 12/218,112

(22) Filed: Jul. 11, 2008

(51) Int. Cl.
*G06F 7/00* (2006.01)
*G06F 17/00* (2006.01)

(52) U.S. Cl. ............... 707/694; 707/805; 705/317

(58) Field of Classification Search ........... 707/694, 707/805; 705/317; 703/21
See application file for complete search history.

(56) References Cited

U.S. PATENT DOCUMENTS

| | | | | |
|---|---|---|---|---|
| 2001/0034835 | A1* | 10/2001 | Smith | 713/175 |
| 2002/0188434 | A1* | 12/2002 | Shulman et al. | 703/21 |
| 2003/0009665 | A1* | 1/2003 | Lee et al. | 713/168 |
| 2003/0163714 | A1* | 8/2003 | Nortung | 713/189 |
| 2005/0108030 | A1* | 5/2005 | Kim | 705/1 |
| 2005/0125794 | A1* | 6/2005 | de Groot et al. | 718/100 |
| 2007/0250769 | A1* | 10/2007 | Bass et al. | 715/523 |
| 2008/0134140 | A1* | 6/2008 | Weiner et al. | 717/105 |
| 2008/0222581 | A1* | 9/2008 | Banerjee et al. | 716/4 |

* cited by examiner

*Primary Examiner* — Phong Nguyen
(74) *Attorney, Agent, or Firm* — Nelson Mullins Riley & Scarborough LLP

(57) ABSTRACT

In an exemplary embodiment, a computer-implemented method for obtaining a persistent design portion of an executable model is provided. The model includes on or more design details, a design detail specifying one or more aspects or elements of the model. The method also includes obtaining a design description of the model and a user selection specifying a design detail to be included in the design portion. The method further includes generating a selection specification from the user selection, obtaining the design portion by processing the design description according to the selection specification, and making the design portion persistent.

11 Claims, 7 Drawing Sheets

PORTION GENERATION, CERTIFICATION, AND VERIFICATION

BACKGROUND

Traditionally in software development, a manager or software tester needs to review a complete software design and decide if the entire design has fulfilled various requirements. If revisions are made to the design, the manager or software tester needs to review the entire design again because reviewing only the portions that have been changed is often not sufficient.

Similarly, in a graphical modeling environment, such as the Simulink® and Stateflow® modeling environments from The MathWorks, Inc. of Natick, Mass., a graphical model design needs to be reviewed by a manager or software tester. If changes are made to the graphical model design, the entire graphical model design is usually reviewed or tested to detect any unintended effects of the changes on other portions of the design that have not been changed. For example, when a sample time of a block is changed, such change may cause the new sample time to be incompatible with a sample time of another block. A graphical model is also not reviewed if it is incomplete, as additions to the model can affect existing parts of the model.

In the construction business, an architect and/or a civil engineer can devise a floor plan and building design, and an electrician or an electrical engineer needs to make sure the floor plan and the building design will accommodate the necessary electrical wiring and comply with safety codes. Sometimes an interior designer and/or a carpenter will also be involved in the design of a building. Building designs are usually reviewed only after they are complete because every time a floor plan is changed, many aspects of the building design are affected and changed as a result. A complete review of the modified building design is performed after any change is made to a complete design. There may be a need for a better review process for a design project so that review may be possible when the design project is still incomplete, and/or so that a complete review of the design project is not necessary when changes are made.

SUMMARY

In one exemplary embodiment, a computer-implemented method for obtaining a persistent design portion of an executable model is provided. The model includes on or more design details, a design detail specifying one or more aspects or elements of the model. The method includes obtaining a design description of the model and a user selection specifying a design detail to be included in the design portion. The method also includes generating a selection specification from the user selection, obtaining the design portion by processing the design description according to the selection specification, and making the design portion persistent.

In another embodiment, a computer-implemented method for assigning a trust attribute to a design portion of a design is provided. The method includes obtaining a design portion which includes one or more design details in the design. The method also includes assigning to the design portion a trust attribute that provides qualitative or quantitative information regarding the design portion. The method further includes applying a stamp of certification to the design portion with the trust attribute to demonstrate that the design portion is certified.

In still another embodiment, a computer-implemented method for validating a stamp of certification applied to a design portion is provided. The method includes obtaining a design portion and identifying that a stamp of certification is applied to the design portion. The method also includes determining if the stamp of certification is valid for the design portion. The method further includes determining whether the stamp of certification is revoked, and that the stamp of certification has not expired.

In yet another embodiment, a system for obtaining and certifying a design portion is provided. The system includes a selection specification mechanism that generates a selection specification. The selection specification specifies information on a design description to be included in the design portion. The system also includes a design portion generator for obtaining the design portion by processing the design description according to the selection specification, a trust attribute editor that assigns, a trust attribute to the design portion, the trust attribute includes qualitative or quantitative information regarding the design portion, and a certification stamp provider that applies a stamp of certification to the design portion with the trust attribute.

In still another exemplary embodiment, one or more computer-readable media storing one or more computer-executable instructions that when executed cause a computer to obtain a persistent design portion of an executable model are provided. The model includes on or more design details, a design detail specifying one or more aspects or elements of the model. The instructions include instructions for obtaining a design description of the model and a user selection specifying a design detail to be included in the design portion. The instructions further include instructions for generating a selection specification from the user selection, obtaining the design portion by processing the design description according to the selection specification, and making the design portion persistent.

In yet another embodiment, one or more computer-readable media storing one or more computer-executable instructions that when executed cause a computer to assign a trust attribute to a design portion of a design are provided. The instructions include instructions for obtaining a design portion which includes one or more design details in the design. The instructions also include instructions for assigning to the design portion a trust attribute that provides qualitative or quantitative information regarding the design portion. The instructions further include instructions for applying a stamp of certification to the design portion with the trust attribute to demonstrate that the design portion is certified.

In another embodiment, one or more computer-readable media storing one or more computer-executable instructions that when executed cause a computer to validate a stamp of certification applied to a design portion are provided. The instructions include instructions for obtaining a design portion, and identifying that a stamp of certification is applied to the design portion. The instructions also include determining if the stamp of certification is valid for the design portion. The instructions further include instructions for determining whether the stamp of certification is revoked, and that the stamp of certification has not expired.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

I. Overview of Exemplary Embodiments

Figure 1:
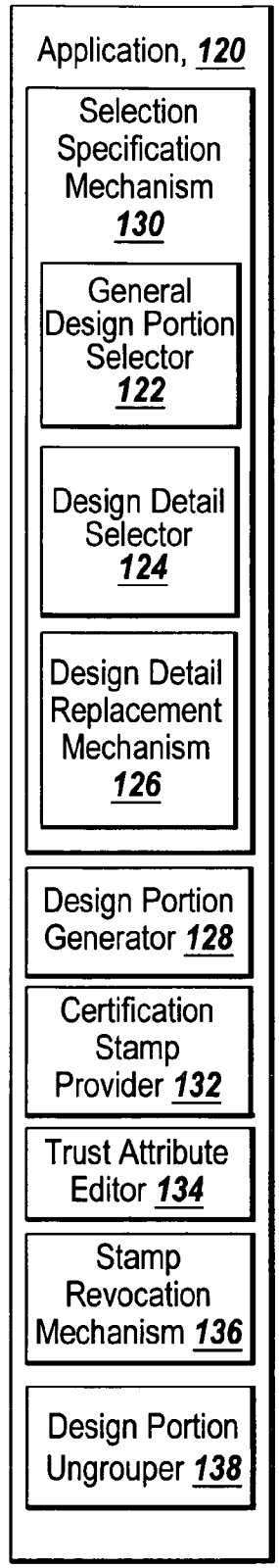
FIG. 1 illustrates a block diagram of one embodiment of the present invention.

Exemplary embodiments provide methods, systems, and one or more computer-readable media storing one or more computer-executable instructions for obtaining a persistent design portion, assigning a trust attribute to a design portion, and applying a stamp of certification to a design portion with a trust attribute. Exemplary embodiments also provide methods, systems, and one or more computer-readable media storing one or more computer-executable instructions for validating a stamp of certification applied to a design portion.

One embodiment of the present invention allows creating or obtaining a persistent design portion of an executable model from one or more design details of a model. A model may include one or more aspects or elements which may be specified by design details. A user may choose one or more design details in a model for inclusion in or exclusion from a design portion. A persistent design portion may then be created by processing a design description describing the model with the user selection specification.

A design description describes the design of a textual and/or graphical model. The textual and/or graphical model may include one or more design details which specify one or more aspects or elements of the model. A design detail may, for example, specify aspects or elements of a graphical element, a block, a signal, a parameter, a data type of a parameter, a dimension of a parameter, a complexity of a parameter, a fixed-point data type, an attribute of a graphical element, a function, a sample time, an event, etc.

A design portion is a part of a design or design description. The design portion associated with an element or aspect described in a design or design description may match the corresponding part of the design or design description. Alternatively, the design portion may be a more general description of the corresponding part of the design or design description. Exemplary embodiments may provide links between the elements or aspects of a design portion. Exemplary embodiments may also allow the elements or aspects in a design portion to act as a single entity.

A design portion may be obtained from a design description using a selection specification generated from a user selection of design details. A selection specification may determine which design details of the design are kept in or excluded from the design portion. The selection specification may also include a more general description to replace one or more design details. Thus, exemplary embodiments allow choice over what design details are included in and excluded from the design portion. A selection specification may specify an element or an aspect of a model, e.g. a graphical element, a block, a signal, a parameter, a data type of a parameter, a dimension of a parameter, a complexity of a parameter, a fixed-point data type, an attribute of a graphical element, a function, a sample time, an event, etc.

Creation of a design portion of a model may leave the graphical structure and semantics of the model intact. Thus, the design portion may be virtual, i.e. may not change the model. In one embodiment, creation of a design portion does not involve making a copy or creating a new version of the model or subsystem described by the design description.

Once a design portion is created or obtained, information of any type generally relevant to the design portion may be assigned to the design portion. A person or an authoritative body may provide a trust attribute to be assigned to the design portion. The trust attribute may contain a description of the quality of the design portion or quantitative information of the design portion. A mechanism may be provided so that other people may retrieve the trust attribute assigned to a design portion. The person or the authoritative body may also provide a stamp of certification to be applied to the design portion with the trust attribute. If necessary, the person or the authoritative body may also choose to revoke the stamp of certification so that the stamp of certification is rendered invalid.

A mechanism may be provided for verification of whether the stamp of certification is still valid. A stamp of certification applied to a design portion before a revision of the design description may still be valid even though the design description has changed since then. If the stamp of certification is still valid, the design portion may still be considered as certified even if the design description has been changed. Thus, no additional review may be needed for the part of the design description that corresponds to the design portion, simplifying the reviewing process of the design description.

Exemplary embodiments may make the design process easier, better and/or faster. The trust attributes stamped on portions of the design may include information that facilitates sound design decisions for different parts of the design. As one example, stamped attributes may include information on skipping unnecessary testing to speed up the design.

As another example, stamped attributes may include information on removing unnecessary saturation codes. Saturation code is necessary in handling overflow calculations to prevent overflow wrapping. Calculations in computers can overflow. An unhandled overflow can cause a value to wrap around, resulting in an incorrect output that can threaten the proper functioning of the system. Overflows are typically handled by a saturation code that specifies additional steps that must be taken in situations that can lead to a calculation overflow. To render extra saturation code unnecessary, exemplary embodiments may provide stamped attributes to indicate that calculation overflow is impossible in a certain design portion. As a result, the leaner code will speed up the design.

II. Motivation

In a modeling environment, a subsystem or system may be copied from one location to another, and even to a completely different model. Conventional techniques of copying a subsystem do not allow a user to configure what design details of the subsystem to include or exclude. For example, in a Simulink®compatible modeling environment, many design details, such as data types of signals, may be determined by the surroundings of the subsystem. As a result, copying a subsystem in such a modeling environment creates polymorphic instances of the subsystems. For the new instance, the surroundings of the subsystem may result in different design details than in the original instance, such as a different data type or dimension. The subsystem copy is not designed to give the user control over which design details are preserved and which ones are discarded. In contrast, exemplary embodiments provide control over design details to include or exclude in a design portion. The subsystem copy also does not copy items from the parent subsystem, such as Embedded Target Characteristics in a Simulink®-compatible modeling environment. Exemplary embodiments may allow items from the parent subsystem to be included in a design portion.

A Simulink®-compatible modeling environment also provides tools to convert a subsystem into a nearly identical standalone system which may be used in subsystem code generation and in converting a subsystem to a reference model. Conventional techniques of converting a subsystem to a standalone system attempts to preserve all the design details. In contrast, exemplary embodiments allow choice over which design details are included and excluded. In addition, specifying a design portion using exemplary embodiments does not involve making a copy or a new model. Thus, all items on the model can be left exactly where they were. In one embodiment, a design portion specification may simply identify the design details to which attributes and signatures apply.

Exemplary embodiments are also distinguished over the conventional use of electronic/digital signatures which sign an entire file, such as a word processing document. In contrast, exemplary embodiments allow application of an electronic/digital signature only in a section of a file describing a design. Thus, electronic/digital signatures may be applied to items such as a selection specification of a design portion and to an assigned attribute.

III. Exemplary Embodiments

Exemplary embodiments may be used to generate, certify and verify design portions in an executable model, i.e. a model that may be executed to model a dynamic system. The model may be graphical or textual. The model may be a distributed or non-distributed model. Exemplary embodiments are described for illustrative purposes relative to a Simulink®-compatible modeling environment that enables a graphical model to be built and/or executed. For example, a Simulink®-compatible modeling environment may be used to create, modify, export or import a model. Although exemplary embodiments may be described relative to a Simulink®-compatible modeling environment, the present invention is not limited to these embodiments.

Further examples of graphical modeling environments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE™ from Esterel Technologies, Inc., among others. Exemplary embodiments can also be used in a text based environment, such as Mathematica® from Wolfram Research, Inc., Maple™ from Maplesoft, Scilab™ from The French National Institution for Research in Computer Science and Control (INRIA), MATLAB from The MathWorks, Inc., among others. Exemplary embodiments can also be used in tools developed for the Electronic Design Automation (EDA) domain and DaVinci Tool Suite.

As illustrated in FIG. 1, for an exemplary embodiment, an application 120 may include a selection specification mechanism 130. The selection specification mechanism generates a selection specification, and the selection specification specifying what information from a design description is included in a design, portion The selection specification mechanism 130 may include a general design portion selector 122 that specifies a general section of the design description for inclusion in the design portion. The selection specification mechanism 130 may also include a design detail selector 124 that specifies a design detail of the design description for inclusion in the design portion or exclusion from the design portion. The selection specification mechanism 130 may further include a design detail replacement mechanism 126. The design detail specification mechanism specifies the replacement of a design detail from the design description with a more general description, so that the more general description of the design detail is included in the design portion. This general description may be used for certain design details for which the specific content/value of the detail is not important as long as the detail fits into the correct category/range.

The application 120 may also include a design portion generator 128 which obtains a design portion from a design description according to a selection specification. In one embodiment, the design portion generator 128 may obtain or create the design portion by grouping one or more elements or aspects specified in the selection specification. The application may assign to a design portion information generally relevant to the design portion. The information may be free-form or structured. The structure in structured information may have a meaning. For example, a design portion may be certified from −10 and 100 and may lie underneath another design portion certified from 0 to 5. In this case, one can infer that the overall certification is from 0 to 5. In some embodiments, information on user characteristics may be assigned to a design portion to restrict who will be allowed to modify the design portion. The user characteristics may include the purpose of the user or the engineering team the user is on, e.g. only users working in the implementation of the model may be allowed to make changes to the design portion. The user characteristics may also include the credentials of the creator of the design portion, e.g. the position of the engineer, the rank in the engineering hierarchy, etc. Write-access to the design portion may be restricted based on these credentials, e.g. only users of one level of authority may edit changes made by another level.

The application 120 may further include a trust attribute editor 134 which assigns a trust attribute to the design portion. The trust attribute may include qualitative and/or quantitative information regarding the design portion. For example, a trust attribute may indicate that a building design portion meets a construction safety standard.

In one embodiment, a user may use the trust attribute editor 134 to enter trust attributes of the design portion. In another embodiment, the trust attribute editor 134 may receive trust attributes via an application programming interface (API) driven by an automated process. The trust attribute editor 134 may also edit the trust attribute that is assigned to a design portion. The application 120 may also include certification stamp provider 132 that provides a stamp of certification that is applied to a design portion with an assigned trust attribute.

A stamp of certification may take many different forms, such as an electronic/digital signature and/or may be encrypted by a private and/or public key. The application 120 may further include a stamp revocation mechanism 136 which revokes a stamp of certification that is applied to a designed portion.

The application may include a design portion ungrouper 138 which ungroups the elements/aspects included in an existing design portion. A design portion may include one or more elements that behave as a single entity. When a design portion is ungrouped, information previously assigned to the design portion may be used to generate information for the individual elements in the design portion. In one embodiment, all the elements of the design portion may be ungrouped simultaneously. For example, a design portion including grouped elements A, B and C may be ungrouped to dissolve the design portion and yield separate, ungrouped elements A, B and C. In another embodiment, the elements may be ungrouped incrementally. As one example, a single element may be ungrouped, leaving the remaining part of the design portion intact. In the design portion of the previous example, only the element A may be ungrouped, leaving behind a design portion including grouped elements B and C and the separate element A. As another example, more than one element may be ungrouped simultaneously based on user specification. yet another example, a larger design portion may be refined into a smaller design portion.

The design portion ungrouper 138 may also split an existing design portion into two or more design portions. For example, a design portion including grouped elements A, B, C and D may be split up to form two new design portions: one including grouped elements A and B, and the other including grouped elements C and D. In one embodiment, the design portion ungrouper 138 may perform the splitting by ungrouping all the elements and forming the new design portions from the ungrouped elements. The design portion ungrouper 138 may organize the design portions resulting from a splitting operation into a hierarchical structure.

The selection specification mechanism 130, the design portion generator 128, the certification stamp provider 132, and the trust attribute editor 134 may be adapted to be included as part of the application 120, or they may each or in any combination be a stand-alone application, module, script, plug-in, a program that responds to calls from the application 120. In alternative embodiments, an application program interface (API) may be provided and used to connect components of the system or to interface the system with other applications. In yet another embodiment, the features provided by selection specification mechanism 130 (including general design portion selector 122, design detail selector 124, design detail replacement mechanism 126), design portion generator 128, certification stamp provider 132, and trust attribute editor 134 may be provided by any number of mechanisms, as deemed appropriate by one of skill in the art.

Figure 2A:
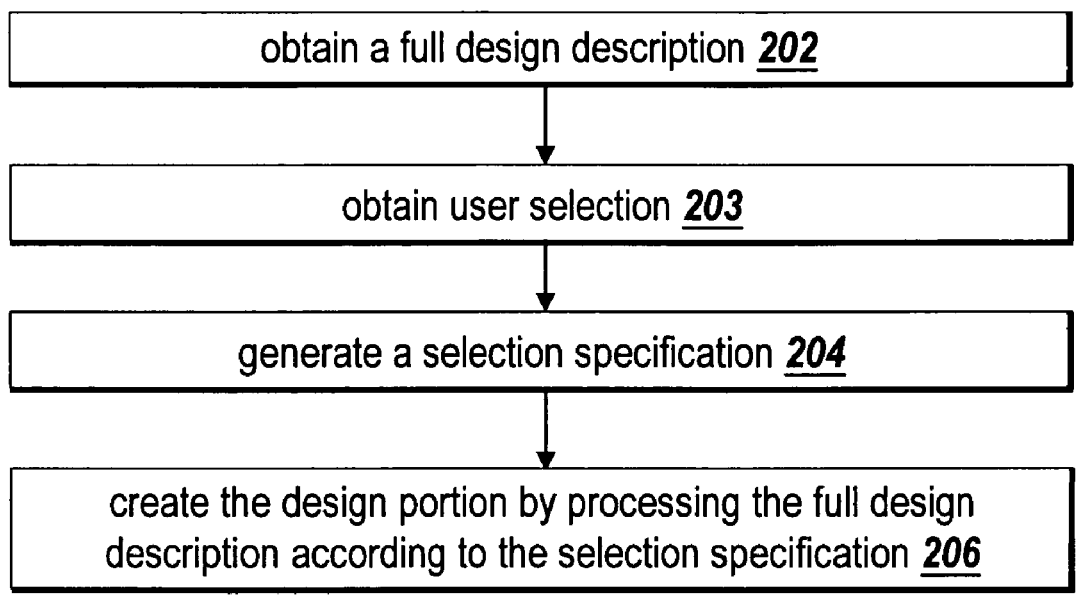
FIG. 2A illustrates a flow chart depicting steps taken to obtain a design portion according to one embodiment of the present invention.

FIG. 2A illustrates a flow chart depicting steps taken to obtain and certify a design portion according to one embodiment of the present invention. In step 202, a design description is obtained. The design description may contain a portion of a textual model and/or an executable graphical model, and include many design details. The design description of a Simulink®-compatible model may be contained in a file that can be retrieved from storage.

A general format of an exemplary text-based design description follows:

```
ModelWideProperties
    BaseSampleRate          Value 7
    SolverType              ODE_foo_bar
SubDesignA
    Item1
        Detail Type A
        Detail Type B       Value 4
    Item2
        Detail Type A
        Detail Type B       Value 9
SubDesignB
    Item1
        Detail Type A
        Detail Type B       Value 6
    Item2
        Detail Type A
        Detail Type B       Value 7
        Detail Type C
SubDesignC
    Item1
        Detail Type A
        Detail Type B       Value 8
```

In the above design description of a model, ModelWideProperties specifies model-wide properties BaseSampleRate and SolverType. The design description also includes description of three discrete portions of the model, SubDesignA, SubDesignB and SubDesignC, which may be subsystems in the model. Within each subsystem are smaller entities entitled Item, which may be blocks in a subsystem. Within each item, the design description describes block-specific design details entitled Detail. For example, the design detail "Detail Type B Value 8" pertains to block "Item1" in subsystem "SubDesignC" of the model.

In an alternative embodiment, the design description may not be text-based as shown in the foregoing example, and a graphical description may be used.

In step 203, a user selection, specifying which design detail from the design description should be included in the design portion, is received. A user may use a file to type in rules in a pre-defined format so that the selection specification mechanism 130 can understand which design detail from the design description should be included in, excluded from, or replaced in the design portion. Alternatively, a user may use a textual/graphical user interface to enter information regarding which design detail the user would like to keep in the design portion. For example, the selection specification mechanism 130 may provide a user interface that allows a user to select which design detail to keep from a list or that allows a user to click to select individual design details from the design description. One of ordinary skill in the art will appreciate that there are many different ways a user may select which design detail should be included in, excluded from, or replaced in the design description.

In one embodiment, the selection specification mechanism 130 may indicate selected and unselected design details on the full design description. Design details selected on a text-based design may be indicated by, for example, coloring, highlighting or placing borders around the corresponding text in the design. Design details selected on a graphical design may be indicated by, for example, graphical indicators, which may include colors, bold type, italic type, shadows, etc. Similarly, design details not selected on a graphical design may be indicated by, for example, highlighting, graying out, making invisible, etc. The selection specification mechanism 130 may indicate selected and unselected design details in the model, in a file containing the model, or the design description. It will be appreciated that selected or unselected design details in a design may be indicated to a user in many different ways.

In step 204, a selection specification may be generated. The selection specification may be generated from the user selection. Some design details from the design description may be included in the design portion while others are excluded. Using the same Simulink®-compatible model example above, the selection specification may be a file that looks as follows:

Selection Rule 1:
 "Keep ModelWide Base Sample Rate"
Selection Rule 2:
 "Keep SubDesignB and Below"
Selection Rule 3:
 "Discard Details Type A"
Selection Rule 4:
 "Keep Details Type B"
Selection Rule 5:
 "In region selected by 'rule 2', replace Detail Type B Value with their comparison to less than 10"

In alternative embodiments, the selection specification may be represented differently from the text shown in the foregoing example, and a graphical representation of the selection rule may be used.

In step 206, the design portion may be created by processing the design description according to the selection specification. Design portion generator 128 may take the design description and the selection specification as input, and may output the design portion. The design portion may be stored in a file, storage medium or any suitable type of record. For example, using the design description example and the selection specification example above, a design portion may look as follows:

ModelWideProperties
 BaseSampleRate Value 7
SubDesignB
 Item1
 Detail Type B True (Value is less than 10)
 Item2
 Detail Type B True (Value is less than 10)
 Detail Type C In this exemplary design portion, the sample rate in the model properties is kept according to Rule 1 of the selection specification. The design portion further includes certain design details of SubDesignB from the design description. Specifically, all the Details Type B are kept without the exact value of the details, and instead a general description of the value of the details is used. Detail Type C is not included in the selection specification. In this example, it is assumed that unmentioned items in the selection specification are kept in the design portion. Alternatively, unmentioned items can instead be discarded by default.

Given a large design and a set of selection criteria, it may be computationally expensive and time-consuming to exhaustively search for potential matches of the criteria in the design. A hierarchy of match criteria may be used in one embodiment to facilitate detection of near matches and to make it easier to clarify the closeness of a match. For example, a system may be organized hierarchically as:

1. In a driver seat control design
 2. In the digital software subsystem
  3. In the module for control of the tilt motor
   4. The seat angle sensor signal -continued 4.1 Maximum angle value is 22 degrees
  4.2 Minimum angle value is 3 degrees When matching selection criteria of angle values in a design such as the above, the matching may progress hierarchically down the above structure. For example, if the highest criteria match for 1-4, but if the lowest criteria 4.1 and 4.2 fail, then the near-match is very close and a very detailed explanation of the failure-to-match may be provided. On the other hand, if the criteria match for 1-3 but fail for 4, then the match is not very close and the explanation of the failure-to-match becomes vaguer and more general, e.g. "the subsystem contains no seat angle sensor signal." Thus, the hierarchy of the design allows the embodiment to provide more specific information about the closeness of a match.

Furthermore, the hierarchy may also prevent cluttered near-matches. A user may specify that only near-matches at a certain hierarchical level are shown. For example, only near-matches that fail only at the lowest level of the hierarchy (level 4.1 and 4.2 in the above example) may be shown. The user may also specify the number of counts of failure that may be shown. For example, only near-matches that fail only at the lowest level of the hierarchy and have no more than 10 individual failures may be shown. The above hierarchy may thus be used to make matching more efficient.

To further reduce the cost associated with this matching, one embodiment may also use anchor points. An anchor point is a tag that indicates that the particular attribute applied at a point also applies downward in the hierarchy. An anchor point would typically be added to a design when the attribute is first created. Alternatively, the anchor could also be added later either manually or when an exact or near-match is found in a search. Anchor points may also be used when part of a design is duplicated within a design or copied to a separate design. In many cases, attribute stamps also apply to the copy, and the anchor points may make it easier to find and check the these attribute stamps.

In one embodiment, creation of a design portion in step 206 leaves the graphical structure and/or semantics of the model or subsystem intact. In these embodiments, the design portions may be virtual, i.e. will not add or remove any elements from the model, will not alter the organization, dependencies or hierarchical structure in the model, etc. For example, in a block diagram model, creation of a design portion will not add or remove any blocks, and will not alter the subsystems in the model or the connections between blocks. In another embodiment, step 206 may involve altering the graphical structure or semantics of the model or subsystem.

In one embodiment, creation of a design portion in step 206 does not involve making a copy or creating a new version of the model or subsystem described by the design description. In another embodiment, step 206 may involve making a copy or creating a new version of the model or subsystem including the design portion.

Figure 2B:
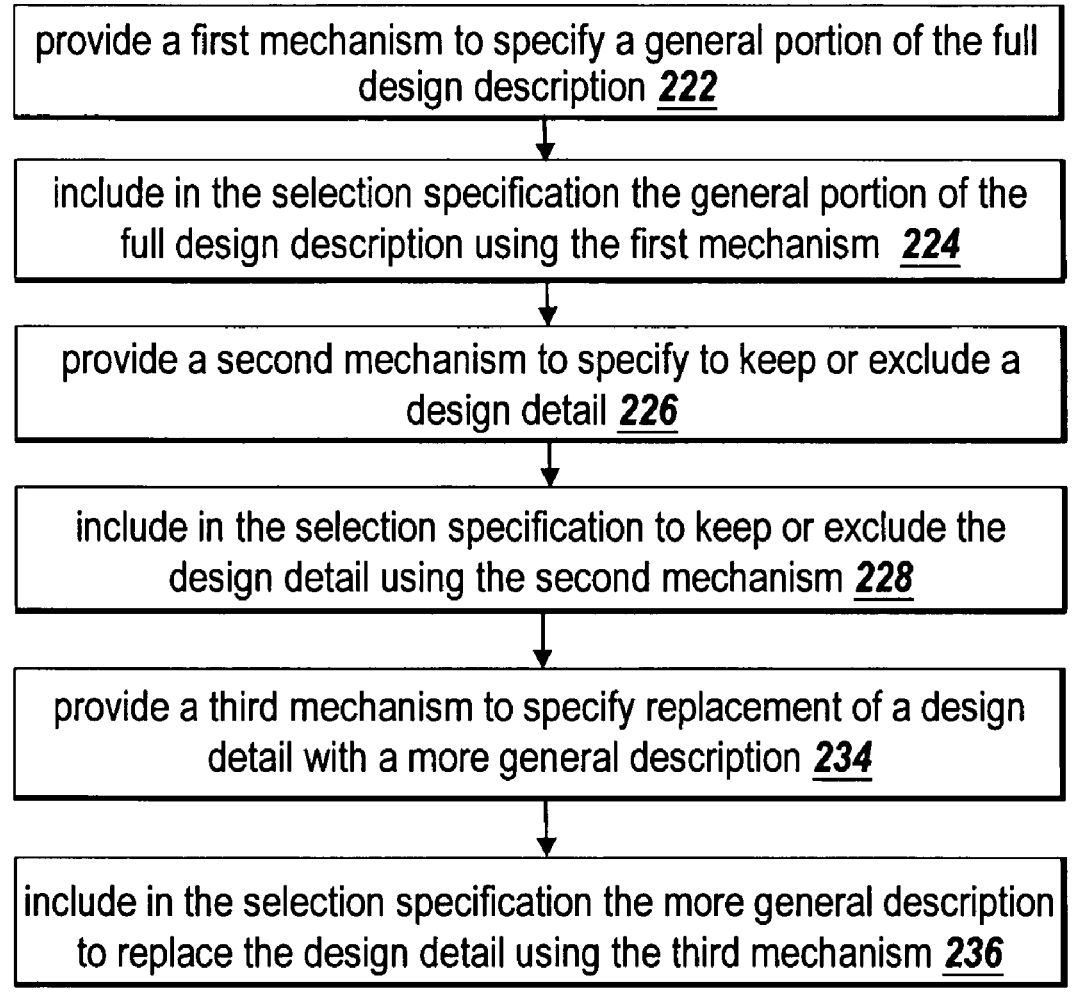
FIG. 2B illustrates a flow chart depicting steps taken to include information in a selection specification that is used to obtain a design portion according to one embodiment of the present invention.

FIG. 2B illustrates a flow chart depicting steps taken to include information in a selection specification that may be used to obtain a design portion according to one embodiment of the present invention. In step 222, a mechanism may be provided to specify a general section of the design description. In one embodiment of the present invention, a software tool can be used that allows a user to point and click or lasso to select a general section of the design description. For example, in a Simulink®.mdl file, a software tool may be provided to allow a user to specify a general section of the full design description (i.e., the .mdl file) by shift clicking, dragging a rectangle over an area, or by lassoing. In another embodiment of the present invention, a textual description of the general section of the full design description can be used. For example, a user may specify to search for items that match a text string, and from the matched items, the user can select which ones are to be included in the design portion.

In addition, the user selections for the selection specification may be done on specified criteria in the model or the design description, i.e. not simply based on a mouse selection. Selection may be based on graphical attributes (e.g., layout or display information) or textual attributes in the model. The attributes may be of different types, e.g. functional, compiled, executable, etc. Selection may also be based on common attributes associated with a set of components in the model, and/or the content of these attributes. Selection may further be based on regular expressions.

Once a user has used the provided mechanism to specify a general section or criterion of the full design description, the general section or criterion of the full design description is included in the selection specification in step 224.

In one embodiment, the selection of general sections or criteria in the selection specification may be restricted to a single hierarchy in the model. In another embodiment, the selection of general sections or criteria in the selection specification may cut across the hierarchical layers in the model as the design portion does not affect the model. For example, the elements in a design portion may be in different parts of the hierarchy of the model. However, creation of the design portion does not affect the hierarchical structure of the model.

In step 226, a mechanism may be provided to specify that a design detail be included or excluded. Various mechanisms can be used independently or in combination to achieve this specification. In one embodiment, a graphical checklist can be provided for a user to put marks against each item. A user can be provided with several options, such as "definitely keep," "definitely exclude," "do not care," etc., so that a user can specify what to do with each item. The graphical checklist can be provided for different level of hierarchy or different kinds of attributes.

Textual description of design details may also be used to search for design details in the design description. A design detail, as located by the search, may then be included in or excluded from a design portion. For example, a user can select to keep all items that match a first text string, and exclude the ones that have a specific property that matches a second text string. The design details to keep or exclude are not restricted to be within the general section specified in step 222. In other words, design details not within the general section specified in step 222 may be specified in step 226 to include in the design portion. Once the details to be included or excluded are specified, this information is included in the selection specification in step 228.

Similarly, meta-tags containing information related to design details may be used to search for design details in the design description. The information contained in the meta-tags may be of various types, e.g. keyword information.

In step 234, a mechanism is provided to specify replacement of a design detail with a more general description. For example, in a design plan for a building, details such as furniture, equipments, etc, are replaced with the maximum weight allowed per square foot for various rooms in the building. In another example, in a Simulink® model, the details of specific signals or parameters using single or double precision are removed and replaced with the requirement that the parameters or signals must be of floating point data type or that the values for the parameters or signals must be within a certain range.

In one embodiment of the present invention, a textual search and replace mechanism may be provided where the user can specify what design details are to be replaced with a more general description. In another embodiment, a graphical user interface may be provided for users to select design details that need to be replaced with a more general description. In step 236, the more general description to replace a specific design detail is included in the selection specification so that the desired design portion may be obtained.

Figure 2C:
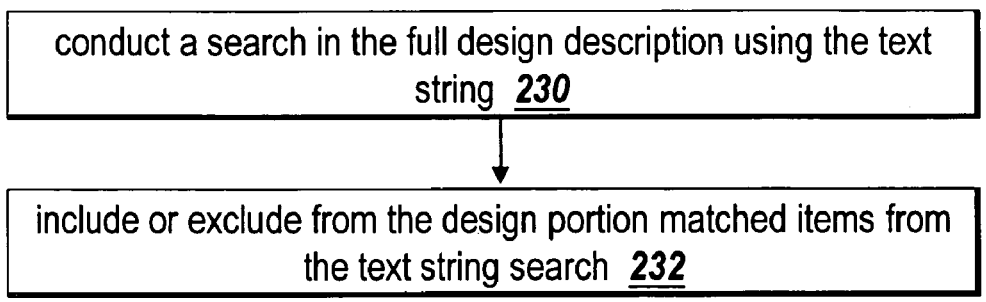
FIG. 2C illustrates a flow chart depicting steps taken to process a design description according to a selection specification in one embodiment of the present invention.

FIG. 2C illustrates a flow chart depicting steps taken to process a full design description according to a selection specification in one embodiment of the present invention. Given a selection specification specified to search for items that match a text string, the design portion generator 128 conducts a search in the full design description using the text string in step 230. The design portion generator 128 then includes in or excludes from the design portion matched items from the text string search in step 232 according to the selection specification. The design portion generator 128 also includes in the design portion design details that are specified in the selection specification. If the selection specification includes information to replace certain design details with a more general description, then the design portion generator 128 finds the design details that need to be replaced, and replaces them with the more general description according to the selection specification. The resultant design details are then included in the design portion.

Exemplary embodiments may include a notion of persistence of the design portion. A design portion may be made persistent by storing the design portion in a memory or storage device. A design portion may also be put in a version control system, e.g. CVS. The description of a design portion may be made persistent by storing the selection specification for the design portion with the model itself.

Exemplary embodiments allow splitting a design portion into two or more design portions. The resulting design portions may be organized in a hierarchical structure. Exemplary embodiments also allow ungrouping the elements of an already-created design portion. When a design portion is ungrouped, information previously assigned to the design portion may be used to generate information for the individual elements in the design portion. In one embodiment, all the elements of the design portion may be ungrouped simultaneously. In another embodiment, the elements may be ungrouped incrementally. As one example, a single element may be ungrouped, leaving the remaining part of the design portion intact. As another example, more than one element may be ungrouped simultaneously based on user specification. As yet another example, a larger design portion may be refined into a smaller design portion.

Figure 3:
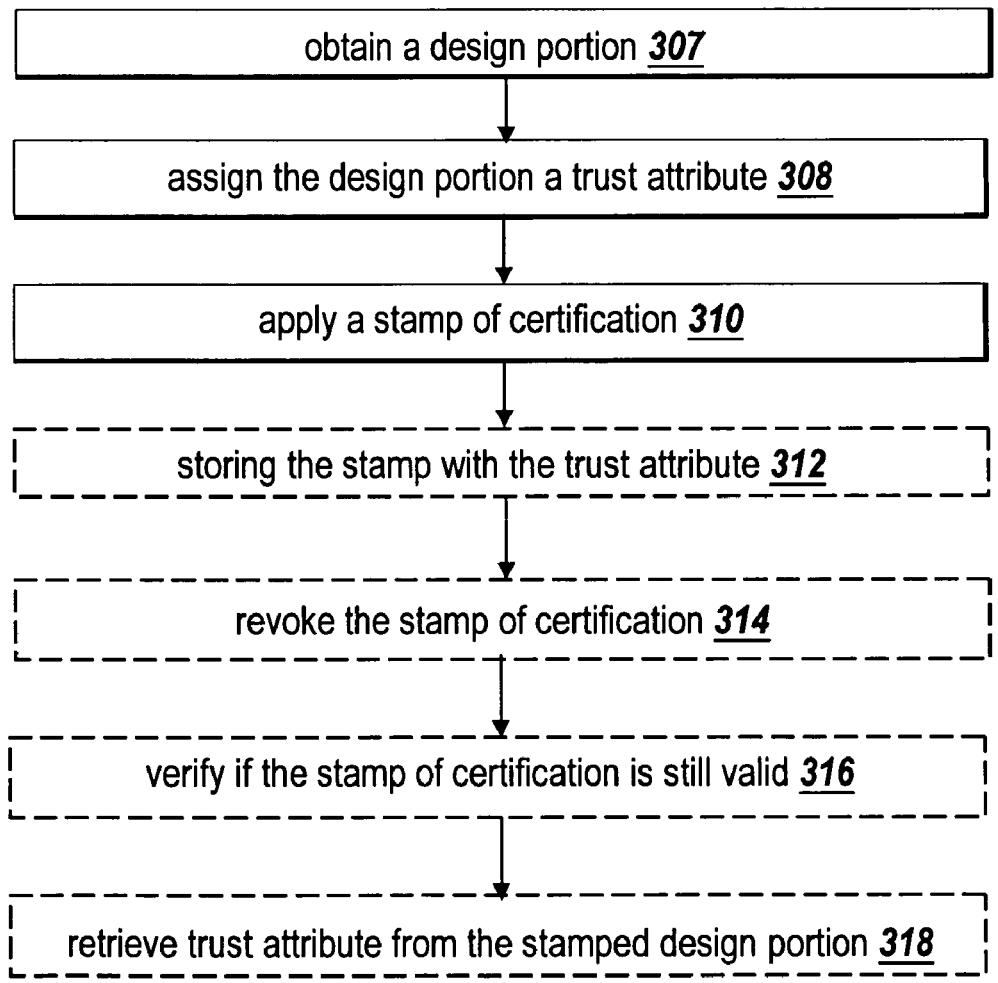
FIG. 3 illustrates a flow chart depicting steps taken to certify a design portion in an exemplary implementation.

FIG. 3 illustrates a flow chart depicting steps taken to certify a design portion in an exemplary implementation. In step 307, a design portion is obtained. In step 308, the design portion is assigned a trust attribute. The trust attribute provides qualitative and/or quantitative information on the design portion. In one embodiment, the trust attribute may be a part of the design portion. Alternatively, the trust attribute may be separate from the design portion.

In step 310, a stamp of certification from an individual or an authoritative body is applied to the design portion with the trust attribute and/or the selection specification. In one embodiment, the stamp of certification can be an electronic/digital signature. In one embodiment, the stamper may encrypt all the items using their private key and if the items can be decrypted using the stamper's public key, then the electronic/digital signature is successfully validated. Alternatively, a hash value calculated based on the items can be encrypted using a private key, instead of the items themselves. In this case, the original hash value needs to be decrypted using the stamper's public key. If a new hash value of the items computed using the same hash algorithm is computed to match the decrypted original hash value, then the electronic/digital signature is successfully validated.

One or more individuals, authoritative bodies, or other certifying entities can digitally sign the selection specification, the design portion, and the trust attribute. The date of the signature, a date of expiration of the stamp, or other dates may also be digitally signed. Additional information, such as identification information and/or credentials about the individual or the authoritative body (e.g. name, job title, license, university degrees, company, address, email, etc), can also be included in the digital signature process. Alternatively, external infrastructure can be used to identify the stamper, such as a public key infrastructure X.509.

In step 312, the stamp of certification, the selection specification, and the trust attribute may be stored for future use. In one embodiment, the stamp of certification, the selection specification, and the trust attribute are inserted in the design description. Alternatively, this information can be stored externally from the design description and the storage location can be included in the design description.

In step 314, the stamp of certification may be revoked after its creation. In one instance of revocation, a stamp may be revoked if there is new data or information that makes the stamper change his/her mind about providing a trust attribute and/or applying the stamp of certification. Using the digital signature example above, a public key revocation, such as a certification revocation list, may be used to indicate that the stamp of certification is no longer valid.

In another instance of revocation, a stamp of certification applied to a design portion may be revoked if the design portion is modified after application of the stamp. In one embodiment, when a constituent element or aspect of a design portion is modified or removed, the stamp applied to the design portion may be automatically revoked. In another embodiment, the user or mechanism modifying or removing the element of aspect may be queried to determine whether to revoke the stamp from the design portion. The stamp may then be removed only if the user or mechanism decides to revoke it. Thus, minor modifications to the design portion may be made without necessarily revoking its stamp of certification.

In step 316, the certification stamp provider 132 may be used to verify if a stamp of certification applied to a design portion is still valid for a current design description. The certification stamp provider 132 may identify if an original design portion is certified with a stamp of certification by checking the elements or aspects of the original design portion for certification marks, labels, tags, etc. The stamp provider 132 may then determine if the stamp of certification is still valid by obtaining a new design portion using the current design description and the selection specification. The new design portion may be compared against the original design portion that the stamp of certification was applied on. If the new design portion matches the original design portion, then the stamp of certification is still valid. The match may be performed on all or a subset of the elements or aspects of the original design portion and the new design portion. The match may also be performed by comparing hash values of the original design portion and the new design portion. For example, a hash value may be calculated and encrypted based on the original design portion, and a new hash value may be calculated based on the new design portion. If the new hash value matches the decrypted hash value, then the stamp of certification is still valid.

In step 318, the trust attribute from the stamped design portion may be retrieved. The trust attribute editor 134 can be used to retrieve the trust attribute that was assigned to a design portion. Other information, such as stamper identification information and credentials may also be retrieved. The result of the match, the trust attribute and other relevant information may be displayed to a user.

Figure 4:
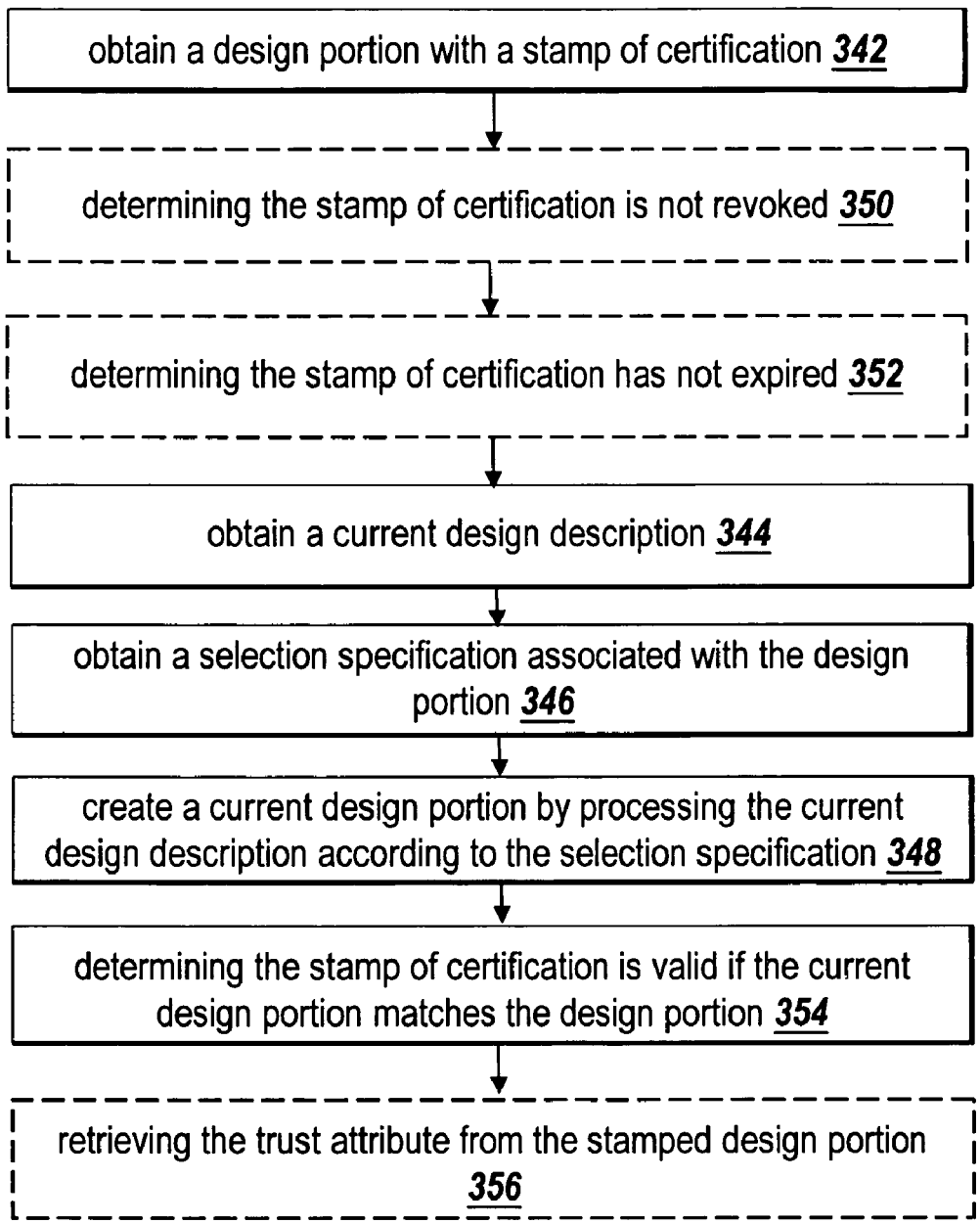
FIG. 4 illustrates a flow chart depicting steps taken to validate a stamp of certification that is applied to a design portion in one embodiment.

FIG. 4 illustrates a flow chart depicting steps taken to validate a stamp of certification that is applied to a design portion in one embodiment. In step 342, a design portion with a stamp of certification is obtained. In one aspect, the stamp of certification itself may be rendered invalid if the stamper of the stamp of certification has revoked the stamp or if the stamp has gone past its expiration date. In this case, certification stamp provider 132 may determine that the stamp of certification applied on the design portion is not revoked in step 350 and/or that the stamp of certification has not expired in step 352.

Generally, the design portion is obtained using an older version of a design description since a design is often modified during development. In step 344, a current design description is obtained. The current design description is the most updated version of the design description. In step 346, a selection specification associated with the design portion is obtained. In other words, the selection specification that was used to create the design portion is obtained. In step 348, a current design portion is created by processing the current design description using the selection specification. If the current design portion matches the design portion, then the stamp of certification is still valid in step 354. In one embodiment, parts of the current design portion that match the design portion and parts of the current design portion that do not match the design portion may be highlighted. In an alternative embodiment, parts of the current design portions that partially or nearly match design portions would be displayed. The specific attributes that partially or nearly match would be displayed and/or highlighted. An exemplary specific attribute would be a gain block parameter that is 8.3 in a current design portion but 7.2 in the design portion. Alternatively, if the parameters were generalized in the design portion, then a matching range may be displayed.

For example, in a design that has parts A, B, and C and a design portion containing design details of part B, if a designer modifies part A of the design, then whatever stamp of certification that was applied to the design portion is still valid (assuming the stamp has not expired and has not been revoked) even though the design as a whole has been changed.

In step 356, the trust attribute from the stamped design portion may be obtained so that a user may see what quantitative and/or qualitative information has been certified by the stamp of certification. In one embodiment, the stamp of certification or the trust attribute may contain credentials of the stamper who applies the stamp of certification to the design portion. In this case, the credentials of the stamper may also be retrieved from the stamped design portion. In one embodiment, the design may be highlighted to indicate the existence of trust attributes. A list of trust attributes in the design may also be displayed. This list may be based on tags placed in the full design description. Alternatively, the list could also be retrieved from an external repository of trust attributes. The repository may include specific mentions of designs to which the trust attributes apply.

To better understand the spirit of the present invention, a few examples are discussed below.

EXAMPLE 1

In a physical modeling environment, a design description may be a physical model that models the behavior of an engine of a vehicle in the winter season. A design portion can be created and a trust attribute applied to the design portion, as set forth below.

Design Portion: A design portion may specify that the minimum value of signal "airTemp" is 0.

Trust attribute: This is a signal measured in Kelvin. It is physically impossible to go below absolute zero. This portion of the design is absolutely certain.

In this example, a code generator may use this information to remove any checking of the behavior of the system below zero Kelvin. The person or entity providing the trust attribute to the design portion may certify the design portion with the trust attribute. A stamp of certification may set forth the identity of the person or entity, such as "Software Engineer Bob Smith." Depending on the credentials of the stamper, a user may or may not have confidence in the information contained in the trust attribute. In other words, if a person without credentials applies a trust attribute to the design portion and stamps the design portion, a user may choose not to believe the information contained in the trust attribute.

EXAMPLE 2

In the construction business, a design description may be an architectural plan of a building. The design description may include the following design portion and associated trust attribute.

Design Portion: A design portion may include limits on the weight of the contents in the building to make sure that the building structure will not collapse due to excessive weight.

Trust Attribute: This design portion is safe and meets all the building codes.

The person or entity providing the trust attribute to the design portion may certify the design portion with the trust attribute. For example, a stamp of certification may be applied to the design portion with the trust attribute by one or more licensed architects. In this case, a tool may be used to track if there is any change to the certified portion of the design. If the detailed contents of the building changes, but the weight limits are not exceeded, then the certified portion of the design stays unchanged. If the certified portion of the design does change, the stamp of certification may be automatically revoked. The certification may be automatically restored if the design is changed back within the parameters of the certified portion of the design.

EXAMPLE 3

In a state diagram programming environment, a design description may include a graphical model of a finite state machine.

Design Portion: A design portion may be a subsystem in the graphical model.

Trust Attribute The design portion meets all the requirements of standard X123.

The person or entity providing the trust attribute to the design portion may certify the design portion with the trust attribute. The stamp of certification may provide the identity and credential of the person or entity, such as "Head of Algorithm Department Dr. E. G. Head." In this case, because of the strong credential of the stamper, extensive tests on the design portion may not be necessary and a smaller and quicker test may be employed instead.

Figure 5:
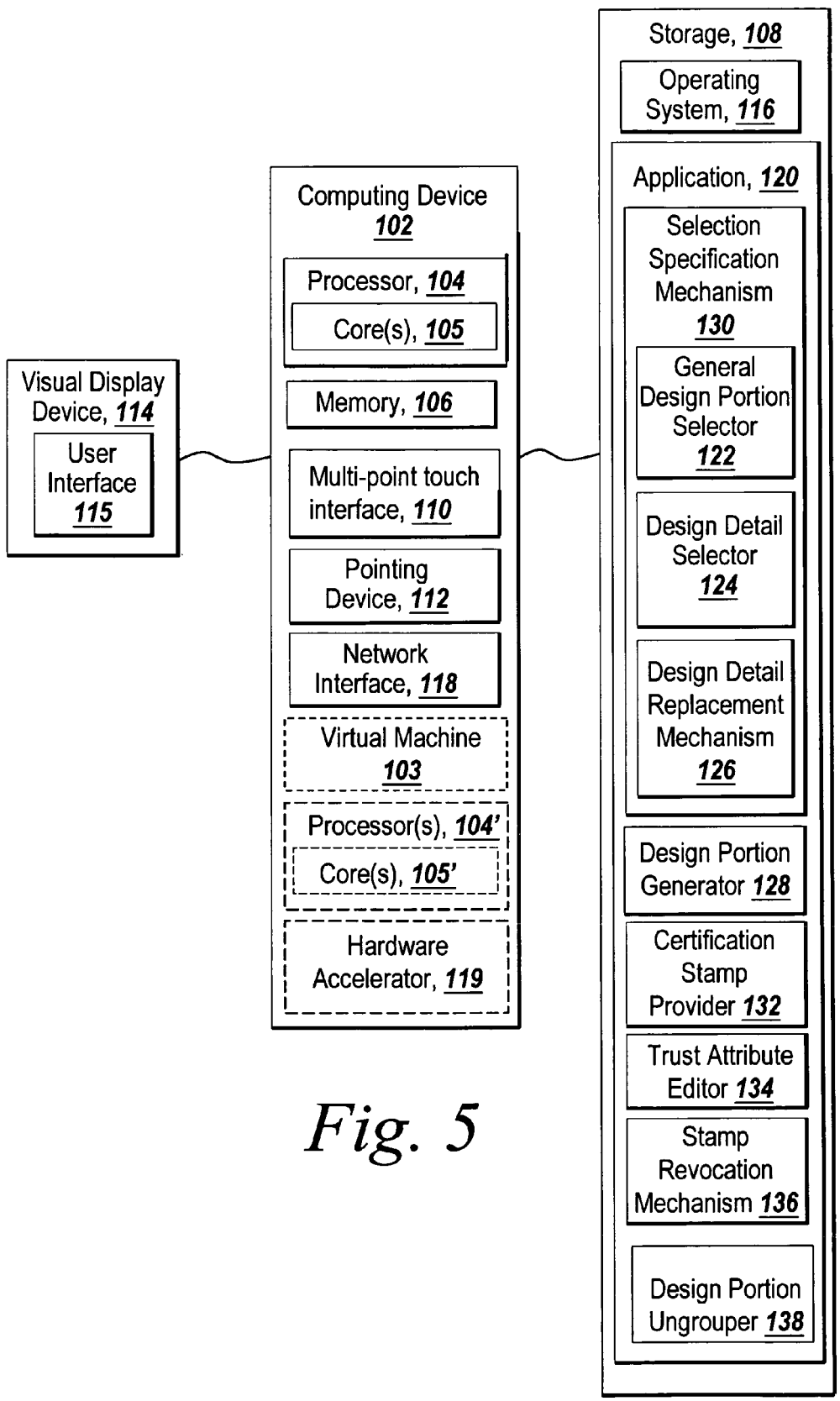
FIG. 5 illustrates a block diagram of a computing device suitable for practicing an embodiment of the present invention.

FIG. 5 depicts a computing environment suitable for practicing an exemplary embodiment. The environment includes a computing device 102 which includes one or more media for storing one or more computer-executable instructions or software for implementing exemplary embodiments. For example, memory 106 included in the computing device 102 may store computer-executable instructions or software, e.g. a model, a design description, a design detail, a design portion, etc.

The computing device 102 also includes processor 104, and optionally, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may include a user interface 115. The user interface 115 may be used to accept user selection of aspects or elements of a model to include in a design portion, and may display a design portion to the user. The visual display device 115 may also display other aspects or elements of exemplary embodiments, e.g. a design or model, a design description, a selection specification. The computing device 102 may include other I/O devices such a keyboard or a multi-point touch interface 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other computer readable media, for storing an operating system 116 and other related software, and for storing application 120, such as the MATLAB® technical computing software.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein. The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 6:
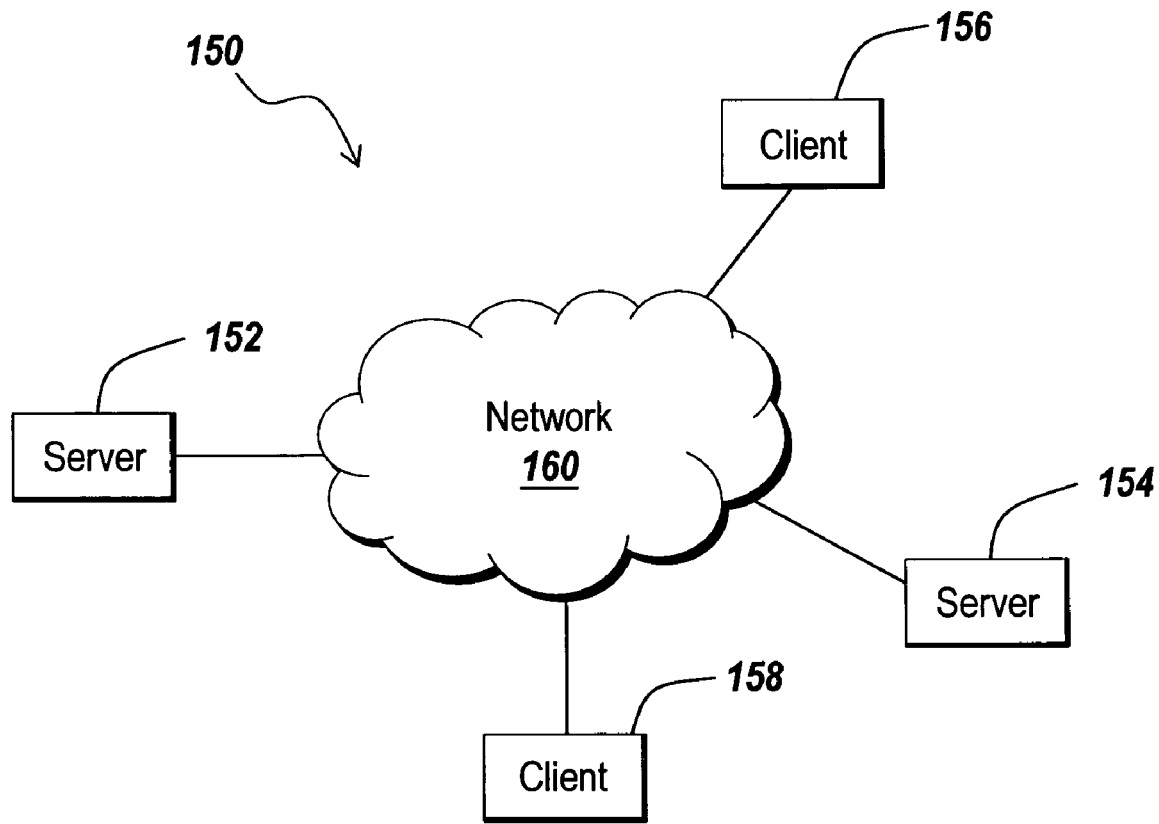
FIG. 6 illustrates an exemplary distributed system suitable for practicing a distributed implementation of an exemplary embodiment.

FIG. 6 is an exemplary network environment 150 suitable for the distributed implementation of an illustrative embodiment. The network environment 150 may include one or more servers 152 and 154 coupled to clients 156 and 158 via, a communication network 160. In one implementation, the servers 152 and 154 and/or the clients 156 and/or 158 can be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth); etc. In addition the network may use middleware, such as CORBA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software component or products may include one or more components of the application 120. For example, the client 156 may perform the modeling of a dynamic system using a software component provided by the application 120 and may send the server 152 the model for processing. The server 152 may return the processing results to the client 156 and the client 156 may subsequently display the processing results to the user.

One of ordinary skill in the art will appreciate that the present invention is not limited to the specific exemplary embodiments described herein. Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A computer-implemented method for assigning a trust attribute to a design portion of a design, the method comprising:

obtaining the design portion, the design portion:
including one or more design details in the design, a design detail specifying one or more aspects or elements of the design, and
being a portion of an executable graphical model of a dynamic system provided in a modeling environment, the graphical model being executable by a computer to simulate a behavior of the dynamic system;
assigning to the design portion a trust attribute that contains a description of a quality of the design portion, and
applying a stamp of certification to the design portion with the trust attribute to demonstrate that the design portion is certified.

2. The method of claim 1, wherein the stamp of certification includes an electronic signature.

3. The method of claim 1, further comprising:
revoking the stamp of certification.

4. A system for obtaining and certifying a design portion, the system comprising:
a processor for providing:
a selection specification mechanism for generating a selection specification that specifies information in a design description of a graphical model to be included in the design portion, the graphical model being an executable model of a dynamic system provided in a modeling environment, the model being executable by a computer to simulate a behavior of the dynamic system;
a design portion generator for obtaining the design portion by processing the design description according to the selection specification; and
a trust attribute assigner for assigning a trust attribute to the design portion, the trust attribute containing quantitative information regarding the design portion;
a storage device for storing the trust attribute, and
a certification stamp provider for applying a stamp of certification to the design portion with the trust attribute.

5. The system of claim 4, wherein the selection specification mechanism further comprises:
a general design portion selector for specifying a general section of the design description.

6. The system of claim 4, wherein the selection specification mechanism further comprises:
a design detail selector for specifying inclusion or exclusion of a design detail.

7. The system of claim 4, wherein the selection specification mechanism further comprises:
a design detail replacement mechanism for specifying replacement of a design detail with a more general description.

8. The system of claim 4, further comprising:
a revocation mechanism for revoking the stamp of certification.

9. A non-transitory computer-readable medium storing one or more computer-executable instructions that when executed cause a computer to assign a trust attribute to a design portion of an executable model, the instructions comprising instructions for:
obtaining the design portion, the design portion:
including one or more design details in the design, a design detail specifying one or more aspects or elements of the design, and
being a portion of an executable graphical model of a dynamic system provided in a modeling environment, the graphical model being executable by a computer to simulate a behavior of the dynamic system;

for assigning to the design portion a trust attribute that contains a description of a quality of the design portion, and applying a stamp of certification to the design portion with the trust attribute to demonstrate that the design portion is certified.

10. The computer-readable medium of claim 9, wherein the stamp of certification includes an electronic signature.

11. The computer-readable medium of claim 9, further comprising one or more instructions for:

revoking the stamp of certification.

\* \* \* \* \*

UNITED STATES PATENT AND TRADEMARK OFFICE
CERTIFICATE OF CORRECTION

PATENT NO. : 8,402,006 B1  
APPLICATION NO. : 12/218112  
DATED : March 19, 2013  
INVENTOR(S) : Andrew C. Bartlett Page 1 of 1

It is certified that error appears in the above-identified patent and that said Letters Patent is hereby corrected as shown below:

On the Title Page, item (54), and in the Specification, Col. 1, line 1, change "Portion Generation, Certification, and Verification" to --Design Portion Generation, Certification, and Verification--.

On the Title Page, item (57), lines 3-4, change "The model includes on or more design details," to --The model includes one or more design details,--.

Signed and Sealed this  
Twentieth Day of August, 2013

Teresa Stanek Rea  
*Acting Director of the United States Patent and Trademark Office*